United States Patent
Hatting et al.

[11] Patent Number: 5,476,271
[45] Date of Patent: Dec. 19, 1995

[54] SHAFT COMPRESSION PACKING

[76] Inventors: Paul Hatting, Tümpweg 15; Bernhard Laufs, Heideweg 49, both of 47906 Kempen, Germany

[21] Appl. No.: 172,128

[22] Filed: Dec. 22, 1993

[30] Foreign Application Priority Data

Dec. 22, 1992 [DE] Germany .................. 42 43 561.7

[51] Int. Cl.$^6$ .................................................. F16J 15/00
[52] U.S. Cl. ......................... 277/105; 277/208; 277/213
[58] Field of Search ............................... 277/9.5, 50, 66, 277/105, 108, 116.4, 125, 178, 207 R, 208, 213, 102

[56] References Cited

U.S. PATENT DOCUMENTS

| | | | |
|---|---|---|---|
| 266,848 | 10/1882 | Lewis | 277/213 |
| 1,840,312 | 1/1932 | Dunmire | 277/213 |
| 2,356,947 | 8/1944 | Pranger . | |
| 3,427,034 | 2/1969 | Lowe | 277/213 |
| 3,748,214 | 1/1974 | Tamplen . | |
| 4,078,810 | 3/1978 | Arendt | 277/116.4 |
| 4,156,529 | 5/1979 | Hafele | 277/105 |
| 4,486,002 | 12/1984 | Reiss . | |
| 4,702,481 | 10/1987 | Brammer | 277/213 |

*Primary Examiner*—Daniel G. DePumpo
*Attorney, Agent, or Firm*—Herbert Dubno; Andrew Wilford

[57] ABSTRACT

A shaft extending along an axis through a bore in a body and forming with the body an axially outwardly open compartment has a seal assembly having an elastomeric sleeve-like seal seated in the compartment and a rigid sleeve generally coaxial with the seal. The seal has a plurality of inner peripheries bearing radially inward on the shaft and an outer end projecting axially out of the compartment. The sleeve is secured axially to the seal for extraction of the seal from the compartment by outward movement of the sleeve.

6 Claims, 4 Drawing Sheets

SHAFT COMPRESSION PACKING

FIELD OF THE INVENTION

The present invention relates to a shaft compression packing. More particularly this invention concerns a stuffing box or compression seal applied around a rotatable and/or axially shiftable shaft.

BACKGROUND OF THE INVENTION

A standard compression packing comprises an elastomeric sleeve that coaxially surrounds a shaft and has a plurality of lips or folds defining annular inner peripheries that radially inwardly engage the shaft. The seal is received in an annular compartment formed in a body surrounding the shaft and is typically axially compressed therein both to force the inner peripheries against the outer surface of the shaft and to prevent leakage axially around the outside of the seal. Such seals are described in U.S. Pat. Nos. 2,356,947, 3,784,214, and 4,486,002.

When the shaft and surrounding body must be separated and/or when the seal itself must be replaced, tools must be employed to get the seal out of the compartment holding it. The long-term compression has typically seated the seal so solidly in place that it is destroyed when it is removed. Frequently also the labor of digging out the seal scratches some surrounding surfaces, since a hard tool like an extractor or screwdriver is usually employed for the removal.

OBJECTS OF THE INVENTION

It is therefore an object of the present invention to provide an improved shaft compression seal.

Another object is the provision of such an improved shaft compression seal which overcomes the above-given disadvantages, that is which can be easily removed without damage to itself or to the surrounding parts.

SUMMARY OF THE INVENTION

A shaft extending along an axis through a bore in a body and forming with the body an axially outwardly open compartment has a seal assembly having according to the invention an elastomeric sleeve-like seal seated in the compartment and a rigid sleeve generally coaxial with the seal. The seal has a plurality of inner peripheries bearing radially inward on the shaft and an outer end projecting axially out of the compartment. The sleeve is secured axially to the seal for extraction of the seal from the compartment by outward movement of the sleeve.

Thus with this system it is possible to extract the seal simply by pulling on the sleeve fixed to it. There is no likelihood of damaging either the seal or the adjacent parts.

According to a further feature of this invention means is provided for axially inwardly biasing the sleeve and thereby axially compressing the seal in the compartment. The sleeve is metallic while the seal is an elastomer.

In accordance with a further feature of this invention the outer end of the seal is formed with a radially open annular groove and the sleeve is formed with a radially projecting annular rim engaging in the groove and axially securing the sleeve to the seal. The groove is radially outwardly open and the rim projects radially inward. Furthermore the outer end of the seal has an outwardly tapered outer surface having a small-diameter outer periphery and a large-diameter inner periphery spaced axially therefrom. The rim has an inner periphery of a diameter smaller than that of the inner periphery and larger than that of the outer periphery.

In another seal assembly according to the invention the sleeve is formed with a radially outwardly projecting flange and means is provided for clamping the flange against the body. The rigid sleeve is axially secured to the seal at this flange.

BRIEF DESCRIPTION OF THE DRAWINGS

The above and other objects, features, and advantages will become more readily apparent from the following description, reference being made to the accompanying drawing in which.

SPECIFIC DESCRIPTION

Figure 1:
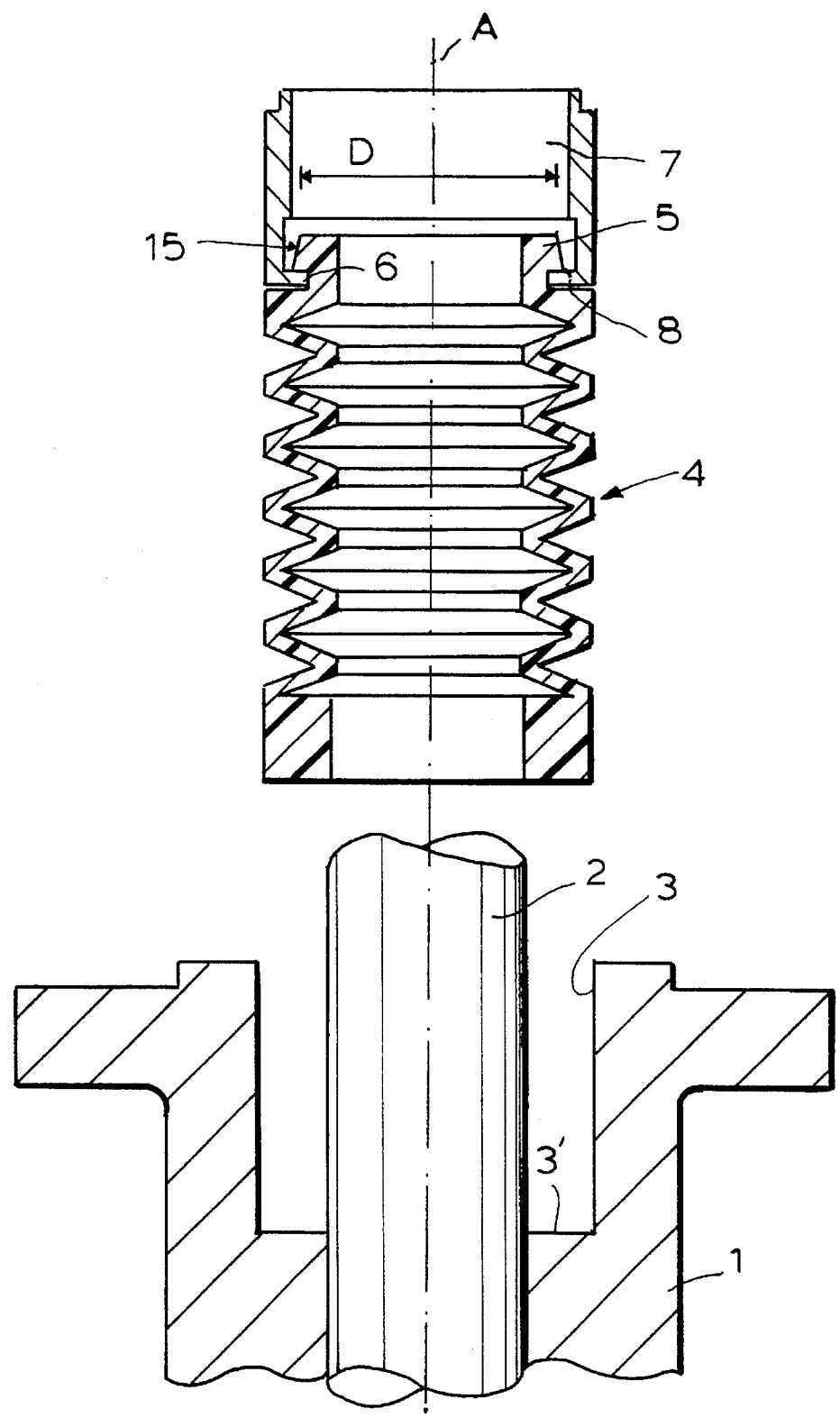
FIG. 1 is an exploded view in axial section of the seal assembly of this invention.
Figure 2:
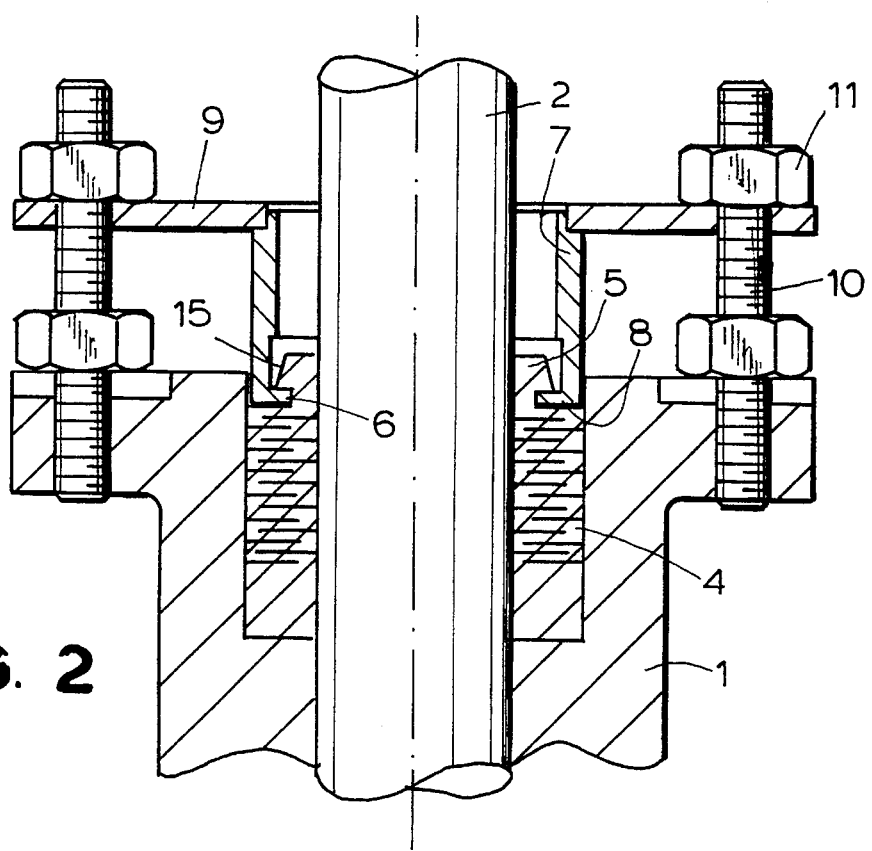
FIG. 2 is an axial section through the seal of FIG. 1.

As seen in FIGS. 1 and 2 a housing body 1 coaxially surrounds a shaft 2 and forms therewith a compartment 3 having a floor 3' extending perpendicular to the axis A. A seal 4 according to the invention made of rubber or a synthetic-resin elastomer is received in this compartment 3 and is axially compressed against the floor thereof by a plate 9 pulled by nuts 11 axially down on threaded studs 10 set in the housing body 1. The seal 4 according to this invention is basically formed as a sleeve or tube centered on the axis A and has either a plurality of folds (FIGS. 1–3) or a plurality of inwardly projecting lips (FIGS. 4 and 5) whose circular inner peripheries bear radially inward on the cylindrical outer surface of the shaft 2.

As seen in FIGS. 1 and 2 the seal 4 has an upper end portion 5 formed with a radially outwardly open rectangular-section groove 6 in which is received a radially inwardly projecting circularly annular rim or lip 8 of a metallic sleeve 7 whose upper end is fitted to a central hole in the plate 9. The upper end 5 of the seal 4 has a frustoconically outwardly (here upwardly) tapered outer surface 15 whose small-diameter outer edge is of smaller diameter than the inner diameter of the lip 8 but whose larger diameter inner edge has a diameter D which is greater than the inner diameter of this lip 8. Thus on initial installation the rim 8 can be forced down over the surface 15 to seat in the groove 8 thereby locking the sleeve 7 to the seal 4. During normal use this sleeve 7 serves to axially compress the seal 4 in the compartment 4 and maintain the fluid-tightness of the joint. To extract the seal 4, one need merely pull out the sleeve 7 and the seal 4 will follow and, since the sleeve 7 is made of durable metal, it can easily be grabbed and pulled with great force without damaging it.

Figure 3:
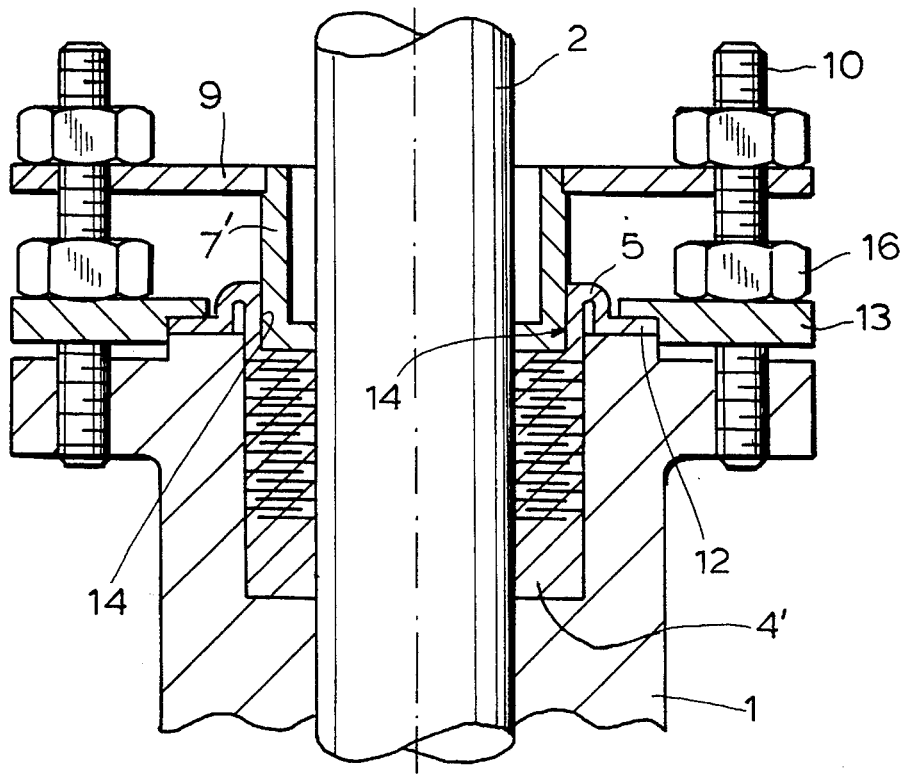
FIGS. 3 and 4 are views like FIG. 2 of two further seals in accordance with this invention.

In the arrangement of FIG. 3 the seal 4' has at its outer end a radially outwardly projecting circular flange 12 that is clamped under a ring 13 secured by nuts 16 on the studs 10. In addition this seal 4' is formed at its outer end with a radially inwardly and radially outwardly open recess or seat 14 into which the lower end of a compression/extractor sleeve 7' is fitted. Means such as complementarily radially interengaging formations on the outside of the sleeve 7' and inside of the seat 14, or an adhesive axially couple the parts 4' and 7' together.

Figure 4:
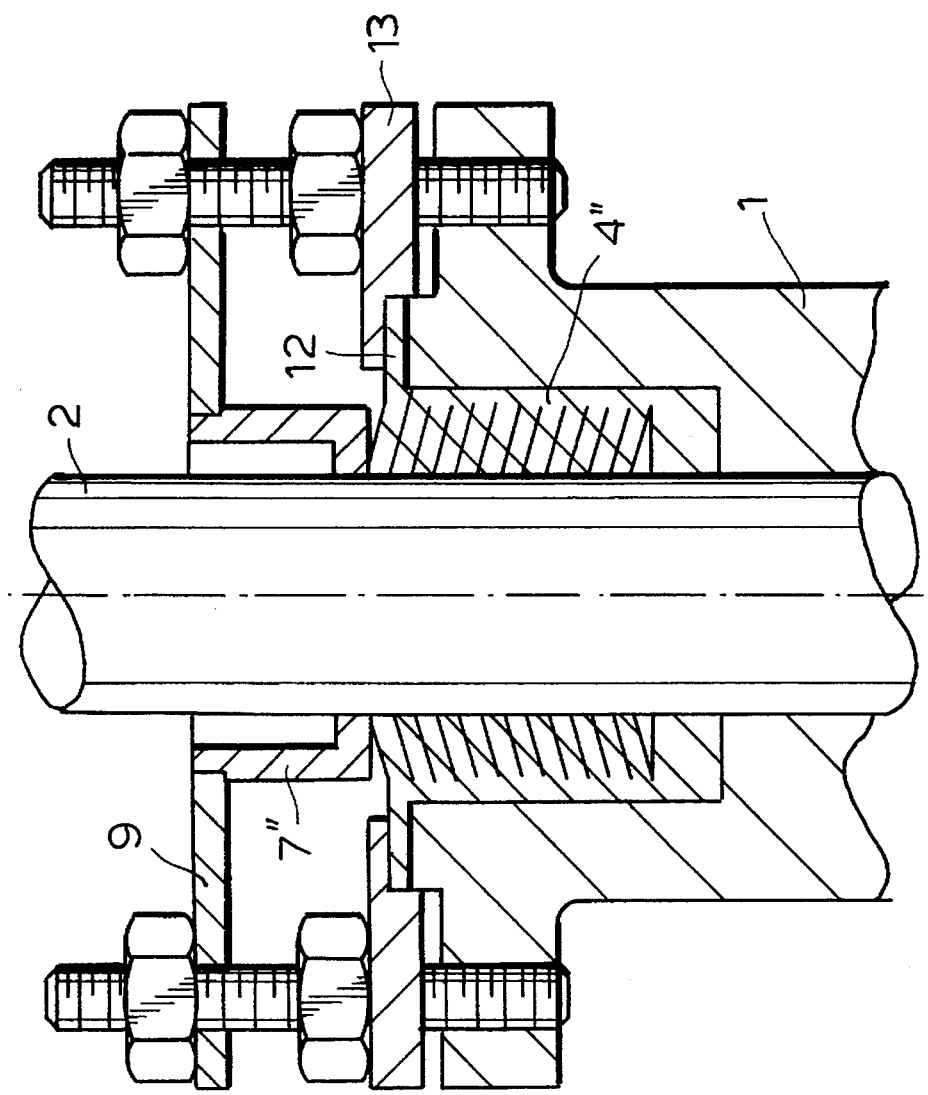
Figure 5:
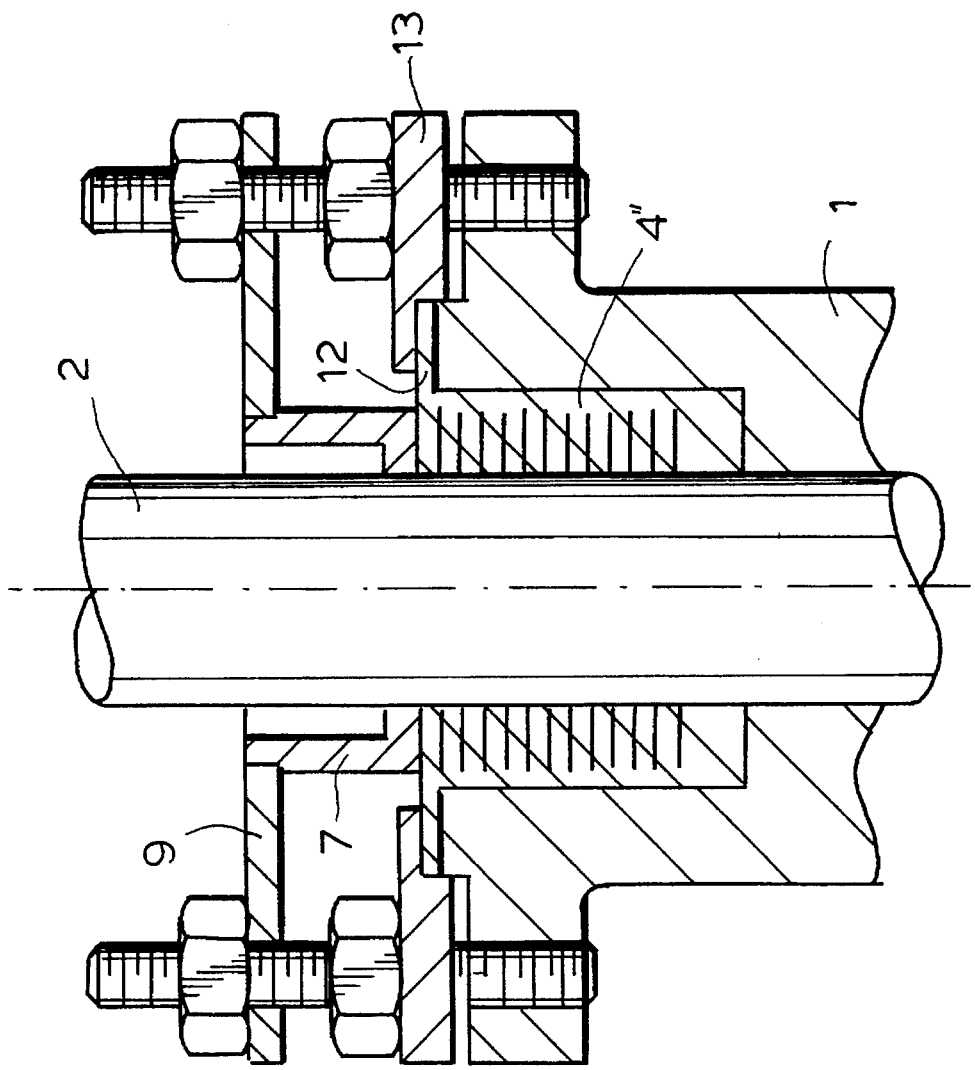
FIG. 5 is a view like FIG. 2 of the seal of FIG. 4 in another position.

In FIGS. 4 and 5 a seal 4" is provided having a radially outwardly projecting flange 12 as in FIG. 3. Here an extractor/compression sleeve 7" sits atop the upper end of the seal 4", bonded to its upper end.

We claim:

1. In combination with a shaft extending along and movable relative to an axis extending through a bore in a body and forming with the body an axially outwardly open compartment, a seal assembly comprising:

an elastomeric tubular seal seated in the compartment and having a plurality of inner peripheries bearing radially inward on the movable shaft and an outer end projecting axially out of the compartment and formed with a radially open rectangular-section annular groove;

a rigid sleeve generally coaxial with the seal and formed with a radially projecting annular rim engaging complementarily in the groove and axially securing the sleeve to the seal for extraction of the seal from the compartment by outward movement of the sleeve; and means fixed on the body and bearing axially inward on the sleeve for axially compressing the seal in the compartment and forcing the inner peripheries into tight axial contact with the movable shaft.

2. The seal assembly defined in claim 1 wherein the sleeve is metallic.

3. The seal assembly defined in claim 1 wherein the groove is radially outwardly open and the rim projects radially inward.

4. The seal assembly defined in claim 3 wherein the outer end of the seal has an outwardly tapered outer surface having a small-diameter outer periphery and a large-diameter inner periphery spaced axially therefrom, the rim having an inner periphery of a diameter smaller than that of the inner periphery and larger than that of the outer periphery.

5. In combination with a shaft extending along and movable relative to an axis extending through a bore in a body and forming with the body an axially outwardly open compartment, a seal assembly comprising:

an elastomeric tubular seal seated in the compartment and having a plurality of inner peripheries bearing radially inward on the movable shaft and an outer end projecting axially out of the compartment and formed with a radially outwardly projecting annular flange;

means for clamping the flange against the body in annular contact with the body all around the bore;

a rigid sleeve generally coaxial with the seal and axially engaging the outer end; and means for axially securing the sleeve to the seal for extraction of the seal from the compartment by outward movement of the sleeve.

6. In combination with a shaft extending along and movable relative to an axis extending through a bore in a body having an axially outwardly directed floor and forming with the body an axially outwardly open compartment, a seal assembly comprising:

an elastomeric tubular seal seated in the compartment and having a plurality of inner peripheries bearing radially inward on the movable shaft and an outer end projecting axially out of the compartment and formed with a radially open annular groove;

a rigid sleeve generally coaxial with the seal and formed with a radially projecting annular rim engaging in the groove and axially securing the sleeve to the seal for extraction of the seal from the compartment by outward movement of the sleeve; and means fixed on the body and bearing axially inward on the sleeve for axially compressing the seal in the compartment against the floor and forcing the inner peripheries into tight axial contact with the movable shaft.

* * * * *